(12) United States Patent
Amuduri

(10) Patent No.: US 11,587,294 B2
(45) Date of Patent: Feb. 21, 2023

(54) SYSTEM AND A METHOD FOR APPLYING AUGMENTED REALITY TECHNIQUE TO AUDITS

(71) Applicant: CARRIER CORPORATION, Palm Beach Gardens, FL (US)

(72) Inventor: Santhosh Amuduri, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/252,602

(22) PCT Filed: Jul. 22, 2020

(86) PCT No.: PCT/IB2020/056869
§ 371 (c)(1),
(2) Date: Dec. 15, 2020

(87) PCT Pub. No.: WO2021/033045
PCT Pub. Date: Feb. 25, 2021

(65) Prior Publication Data
US 2022/0180611 A1    Jun. 9, 2022

(30) Foreign Application Priority Data
Aug. 22, 2019    (IN) .............................. 201911003899

(51) Int. Cl.
*G06T 19/00*        (2011.01)
*G06Q 10/20*       (2023.01)
*G07C 9/00*        (2020.01)

(52) U.S. Cl.
CPC ........... *G06T 19/006* (2013.01); *G06Q 10/20* (2013.01); *G07C 9/00174* (2013.01); *G07C 2209/62* (2013.01)

(58) Field of Classification Search
CPC ... G07C 9/00174; G06Q 10/20; G06T 19/006
See application file for complete search history.

(56) References Cited

U.S. PATENT DOCUMENTS

2016/0313902 A1* 10/2016 Hill .......................... G06F 3/017
2017/0091607 A1*  3/2017 Emeis ..................... G06T 11/00
(Continued)

FOREIGN PATENT DOCUMENTS

KR        20050020158 A      3/2005
KR         100648048 B1    11/2006

OTHER PUBLICATIONS

English Translation of KR 100648048, 2006 (Year: 2006).*
(Continued)

*Primary Examiner* — Charles Tseng
(74) *Attorney, Agent, or Firm* — Cantor Colburn LLP

(57) ABSTRACT

Aspects of the invention are directed towards a system and a method for applying augmented reality technique to audits related to a device. One or more embodiments of the invention describe a method comprising steps of receiving audits from a first device by a second device over a communication channel, the audits associated with one or more components of the first device. The method further comprises steps of analyzing the audits by the second device to generate an audit report of a status of each of the one or more components and generating an augmented reality image for the one or more components by the second device based on a pre-generated image, the augmented reality image exhibiting as a status in the audit report of the one or more components of the first device.

15 Claims, 6 Drawing Sheets

(56) References Cited

U.S. PATENT DOCUMENTS

2018/0073274 A1   3/2018  Johnson et al.
2019/0114816 A1*  4/2019  Tham .................. H04B 10/114

OTHER PUBLICATIONS

International Search Report for International Application No. PCT/IB2020/056369: Application Filing Date: Jul. 22, 2020; dated Sep. 25, 2020; 3 pages.
Written Onion for International Application No. PCT/IB2020/056869; Application Filing Date: Jul. 22, 2020; dated Sep. 25, 2020; 7 pages.

* cited by examiner

SYSTEM AND A METHOD FOR APPLYING AUGMENTED REALITY TECHNIQUE TO AUDITS

CROSS REFERENCE TO RELATED APPLICATIONS

This Applications is a National Stage Application of PCT/IB2020/056869, filed Jul. 22, 2020, which claims the benefit of India Application No. 201911033899, filed Aug. 22, 2019, the disclosures of which are incorporated herein by reference in their entirety.

TECHNICAL FIELD OF INVENTION

The present invention relates to electronics locks and locking systems. More particularly, the present invention relates to a system and a method for applying augmented reality technique to audits related to a lock.

BACKGROUND OF THE INVENTION

At present, a lock is installed in a door to lock or unlock the door of a room. When the lock does not work properly or, if there is any malfunctioning in a component of the lock, a technician needs to open the lock and examine each component of the lock properly to know the reason for malfunctioning of the component of the lock or the lock.

With the advancement in technology, the lock has been provided with several features. One of such feature of the lock is monitoring each component of the lock for malfunctioning. This information of each component of the lock may be stored in the lock as lock audits or may be sent to a server. The lock audits include all the information related to the status of each component of the lock associated with the door of the room.

Such lock audits may be accessed/retrieved offline by the user or any other person through existing lock audit mechanisms. The existing lock audit mechanisms for accessing/retrieving the lock audits offline from the lock include a portable programmer (XPP). The portable programmer (XPP) first retrieves the lock audits from the lock and then the portable programmer (XPP) needs to be connected manually to the server or a front desk system. The portable programmer (XPP) uploads these lock audits to the server or the front desk system which can then be accessed/retrieved offline by the user or any other person.

Once the lock audits are retrieved offline from the lock or the server, the user or the any other person has to manually read and analyze the lock audits to understand the lock audits. This is a time-consuming task, requires a lot of effort and manual intervention to understand the lock audits. Currently, there exists no solution through which the lock audits can be read and understood in an easy and a simple way.

In view of the afore-mentioned problems in the existing solutions, there is a need of an effective system and method that presents lock audits in an easy-to-understand and a simple way. There is also a need to eliminate manual intervention to understand the lock audits. There is also a requirement to reduce the time for analyzing and understanding the lock audits. In order to solve the problems in the existing solutions, a system and a method are disclosed.

SUMMARY OF THE INVENTION

Various embodiments of the invention describe a method and a system for generating an augmented reality image that exhibits a status of each of the component/s of the lock. The invention provides a method comprising the steps of receiving audits from a first device by a second device over a communication channel, the audits associated with one or more components of the first device. Audits are analyzed by the second device to generate an audit report of a status of each of the one or more components. Each audit is associated with a pre-generated image for the one or more components. The method further comprises the steps of generating an augmented reality image for the one or more components by the second device based on the pre-generated image, the augmented reality image exhibiting as the status in the audit report of the one or more components of the first device.

In an embodiment of the invention, the audit report comprises the status of the one or more components of the first device, wherein the status comprises a working state, a failure state or an about-to-fail state of the one or more components.

In another embodiment of the invention, the second device identifies a solution for the one or more components of the first device when the status of the one or more components corresponds to a failure state or an about-to-fail state of the one or more components.

In a different embodiment of the invention, the solution for the one or more components is exhibited in the augmented reality image along with the status of the one or more components of the first device.

In another embodiment of the invention, the second device determines an error margin by comparing an implementation of the solution on the first device with the solution identified by the second device.

In an embodiment of the invention, the augmented reality image comprises a highlighted component based on the status in the audit report of the component.

In another embodiment of the invention, the augmented reality image comprises superimposition of the status of a component on the pre-generated image or projection of the status of a component on the pre-generated image.

In yet another embodiment of the invention, the communication channel between the first device and the second device corresponds to a short-range communication channel.

In another embodiment of the invention, the first device corresponds to a lock and the second device corresponds to a user device or an augmented reality camera. Further, the augmented reality image is rendered on a user device.

In another embodiment of the invention, the augmented reality is generated by an augmented reality camera, wherein the generated augmented reality image is communicated to a user terminal via a server.

In another embodiment of the invention, an augmented reality password is generated to unlock or access the augmented reality image. The augmented reality password comprises a sequence in which the one or more components of the first device are to be selected to unlock the augmented reality.

In another embodiment of the invention, the pre-generated image for the one or more components is stored in the second device. The second device fetches the pre-generated image from a server.

In yet another embodiment of the invention, a system is disclosed comprising a first device and a second device. The first device comprises a status detector unit adapted to detect status of each of one or more components of the first device. The first device comprises an audit generation unit adapted to generate audits after receiving the status of each of one or more components from the status detector unit. The first device also comprises a communication unit adapted to transmit the audits associated with the first device over a communication channel. Moreover, the second device comprises a communication module adapted to receive the audits from the communication unit of the first device and an audit unit adapted to analyze the audits to generate an audit report of a status of each of the one or more components, each audit associated with a pre-generated image for the one or more components. The second device also includes an augmented reality unit adapted to generate an augmented reality image for the one or more components based on the pre-generated image, the augmented reality image exhibiting as the status in the audit report for the one or more components of the first device.

In an embodiment of the invention, the augmented reality image comprises of a highlighted component based on the status in the audit report of the component.

In another embodiment of the invention, the augmented reality image comprises of superimposition of the status of a component on the pre-generated image or a projection of the status of a component on the pre-generated image.

In a further embodiment of the invention, the audit report comprises of the status of the one or more components of the first device, wherein the status comprises a working state, a failure state or an about-to-fail state of the one or more components.

In another embodiment of the invention, the first device corresponds to a lock and the second device corresponds to a user device or an augmented reality camera. Further, the augmented reality image is generated by an augmented reality camera and the generated augmented reality image is communicated to a user terminal via a server.

In a further embodiment of the invention, the augmented reality unit is adapted to generate an augmented reality password to unlock or access the augmented reality image and the augmented reality password comprises a sequence in which the one or more components of the first device are to be selected to unlock the augmented reality.

In a further embodiment of the invention, the pre-generated image for the one or more components is stored in the second device. The second device fetches the pre-generated image from a server.

In various other embodiments of the invention, a method is disclosed comprising the steps of receiving audits from a first device by a server over a communication channel, the audits associated with one or more components of the first device. The method further comprises the steps of analyzing the audits by the server to generate an audit report of status of each of the one or more components, each audit associated with a pre-generated image for the one or more components. The method further comprises the steps of generating an augmented reality image for the one or more components by the server based on the pre-generated image stored on the server, the augmented reality image exhibiting as the status in the audit report of the one or more components of the first device This summary is provided to introduce a selection of concepts in a simplified form from that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology for a system and a method for analyzing audits to generate an audit report and generating an augmented reality image that exhibits a status of component/s of a lock based on the audit report. Further, the augmented reality image is generated by a second device when the second device receives audits from a first device.

As used herein, the first device corresponds to a lock. The first device includes, but is not limited to, an auxiliary cylinder, a deadbolt, a liver trim, a latch bolt, an auxiliary latch, a communication unit, a status detector, an audit generation unit, a processor and a memory. The first device may communicate with the second device through a short-range communication channel. The first device may also communicate with a server through the short-range communication channel or a cellular communication channel. Specifically, an offline lock may communicate with server using a bluetooth mesh network as one lock can talk to other lock. Also, an online lock may directly update or communicate with the server upon a request.

As used herein, the second device corresponds to a user device or an augmented reality camera. The second device may communicate with the first device through a short-range communication channel. The second device may be a desktop computer or a hand held device such as a mobile phone with a communication module, an interface, a processor, a memory and with network connectivity etc. Example of the second device includes a desktop, workstation PC, a laptop, a smart phone, a tablet, a wearable device and the like.

As used herein, the server has some processing capabilities and may also communicate with the first device or a user terminal. Such server may be a cloud storage, a remote database, or any such storage known in the art.

As used herein, the short-range communication channel may refer to a communication channel established through a Wi-Fi access point, a bluetooth network, a near-field network, a ZigBee network or any such network known in the art.

As used herein, the cellular communication channel may refer to a communication channel established through a Global System for Mobile (GSM) network, Long-Term Evolution (LTE) network, a code-division multiple access (CDMA) network, a narrow-band internet of thing (NB-IoT)

technique or category Ml technique, a bluetooth mesh network or any such network/technique that is known in the art.

Figure 1:
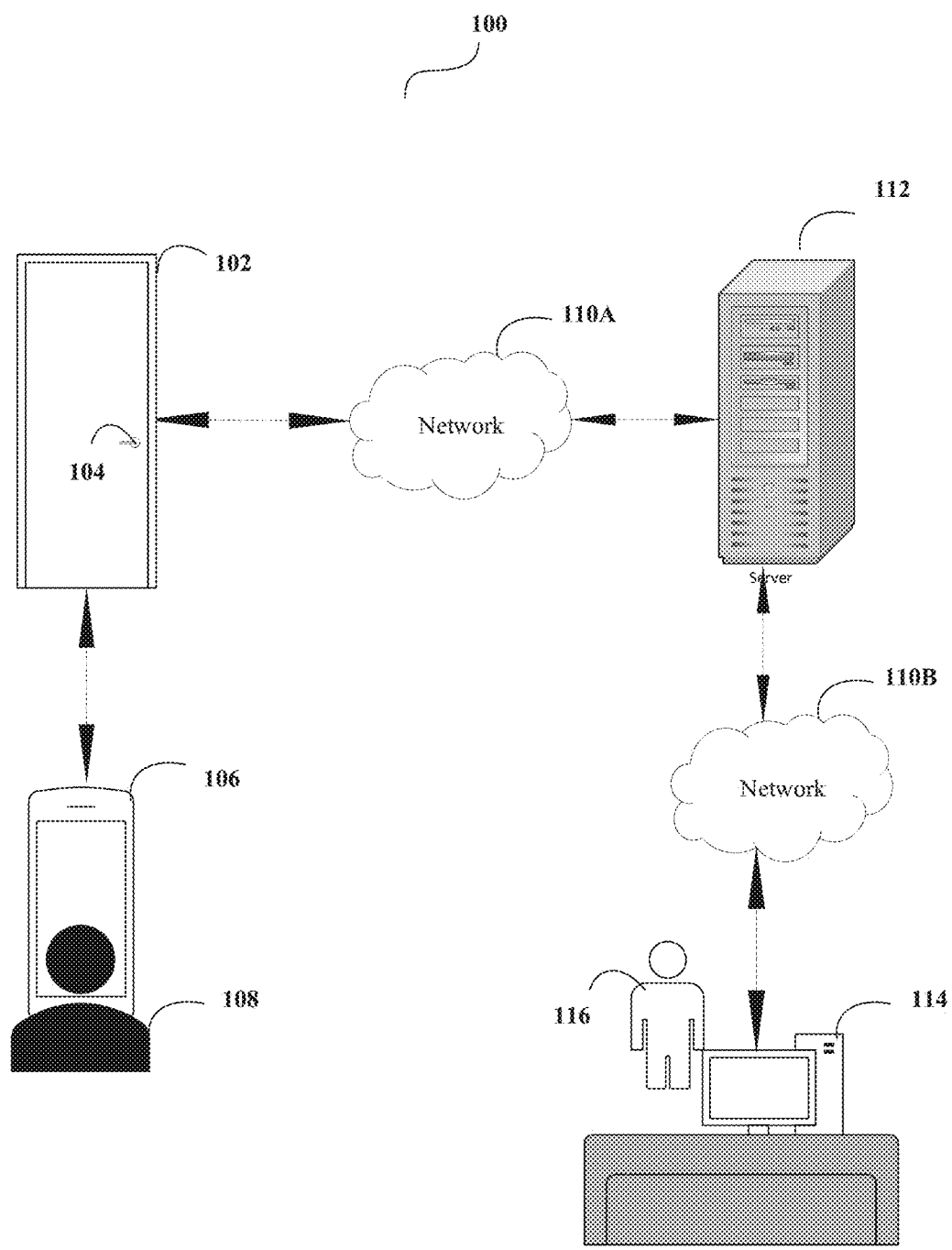
FIG. 1 depicts an exemplary system architecture according to an exemplary first embodiment of the invention.

FIG. 1 depicts an exemplary system architecture 100 in accordance with a first exemplary embodiment for analyzing audits to generate an audit report and generating an augmented reality image that exhibits a status of component/s of the lock in the audit report, according to an exemplary first embodiment of the invention. As depicted in FIG. 1, the system architecture 100 comprises a door 102, a first device 104 associated with the door 102, a second device 106, a user 108 associated with the second device 106, a server 112 connected with the network 110A/110B, a user terminal 114 and a person 116 associated with the user terminal 114.

The first device 104 may detect a status of each of one or more components of the first device 104. Such detection of the status of the one or more components of the first device 104 may be performed periodically by the first device to determine status of the each of one or more components. The status includes, but not limited to, a working state, a failure state or an about-to-fail state of the one or more components. The first device 104 may generate audits after receiving of the status of each of the one or more components. The audits associated with the first device 104 may be a message or an information that contains the status of the one or more components of the first device 104. The first device 104 may transmit the audits associated with the first device 104 to the second device 106 over a short-range communication channel. As used herein, the audits associated with the first device 104 may be internal audits including status (i.e. working state, a failure state or an about-to-fail state) of each of one or more components. The audits may be external audits which may be related to an application or functionality errors of the first device 104. Also, the audits may include an augmented view of the first device 104 along with an indication of a position/location where an error or problem has occurred in the first device 104 based on the status in the audit report.

When, the second device 106 receives the audits associated with the first device 104, the second device 106 may analyze the audits to generate an audit report of the status of each of the one or more components of the first device 104. Each audit is associated with a pre-generated image for the one or more components. The pre-generated image for the one or more components is already stored on the second device 106. In case, the second device 106 does not have the pre-generated image, then the second device 106 may fetch the pre-generated image from the server 112. The audit report includes all the audits generated and transmitted by the first device 104. The second device 106 may analyze the audits to retrieve the status of the one or more components of the first device 104 and then the second device 106 may compile the status of the one or more components in an audit report.

Once the audit report is generated by the second device 106, the second device 106 may generate an augmented reality image of the one or more components based on the pre-generated image. The augmented reality image exhibits the status in the audit report for the one or more components of the first device 104. The second device 106 may generate the augmented reality image by using the pre-generated image for the one or more components to exhibit as the status in the audit report. In other words, the second device 106 may map each audit with the one or more components shown in the pre-generated image. The augmented reality image may be rendered/displayed on the second device 106. In an embodiment, the user 108 associated with the second device may be a technician who can rectify the components based on the status exhibited in the augmented reality image. This has been explained in detail in FIG. 3.

In an alternative embodiment, the present invention also encompasses the first device 104 to transmit the audits associated with the first device 104 to the server 112 over the network 110A. The server 112 may then receive the audits associated with the first device 104 and the server 112 may analyze the audits to generate an audit report of the one or more components of the first device 104. Each audit is associated with a pre-generated image for the one or more components. The audit report includes all the audits generated and transmitted by the first device 104. The server 112 may analyze the audits to retrieve the status of the one or more components of the first device 104 and then the server 112 may compile the status of the one or more components in the audit report. Once the audit report is generated by the server 112, the server 112 may generate an augmented reality image for the one or more components based on the pre-generated image. In other words, the server 112 may map each audit with the one or more components shown in the pre-generated image. The pre-generated image of the one or more components is already stored in the server 112. The augmented reality image exhibits the status in the audit report of the one or more components of the first device 104. Then, the person 116 associated with the user terminal 114 may retrieve/access the augmented reality image (exhibiting as the status of the one or more components) from the server 112 using the network 110B. The network 110A/110B may be a cellular network. In an embodiment, the person 116 may be a hotel staff or a front desk officer who can retrieve/access the augmented reality image from the server 112 using the network 110B.

The present invention facilitates the second device 106 or the server 112 to identify a solution for the one or more components of the first device 104 when the status of the one or more components corresponds to a failure state or an about-to-fail state of the one or more components. Once the second device 106 or the server 112 identifies the solution for the one or more components of the first device 104, the solution for the one or more components is exhibited in the augmented reality image along with the status of the one or more components of the first device 104. As an example, the first device 104 transmits the audit report to the second device 106 or the server 112 including a status of a memory associated with the first device 104 corresponding to the failure state or the about-to-fail state. When the second device 106 or the server 112 determines that a status of the memory associated with the first device 104 corresponds to the failure state or the about-to-fail state, then the second device 106 or the server 112 identifies a solution such as "replace the memory" or "erase data in the memory" in case the memory does not have enough space to further store the data. In another example, the first device 104 transmits the audit report to the second device 106 or the server 112 including a status of a battery associated with the first device 104 corresponding to the failure state or the about-to-fail state. When the second device 106 or the server 112 determines that the battery associated with the first device 104 corresponds to the failure state or the about-to-fail state, then the second device 106 or the server 112 identifies a solution such as "replace the battery" or "recharge the battery". These solutions as identified by the second device 106 or the server 112 may be exhibited in the augmented reality image along with the status of the one or more components of the first device 104.

The present invention further facilitates the second device 106 or the server 112 to determine an error margin. The second device 106 or the server 112 may determine the error margin by comparing an implementation of the solution (for the one or more components) on the first device with the solution identified by the second device 106. The identified solutions for the components may be stored in the server 112. Alternatively, the identified solutions for the components may be fetched by the second device 106 from the server 112. For an example, when the second device 106 or the server 112 determines that a state of the battery associated with the first device 104 corresponds to the failure state, then the second device 106 or the server 112 may identify a solution such as "recharge the battery to 100%". In such a case, the second device 106 or the server 112 may compare an implementation (i.e. current status for recharging the battery) with the solution (i.e. charge the battery to 100% or fully charge the battery). If the current implementation of the solution charges the battery only to 60%, then the second device 106 or the server 112 may identify an error margin such as 40% battery is still left to be charged. This error margin may be determined by comparing the implementation of the solution for the one or more components (i.e. 60% battery charge) with the solution (charge the battery to 100% or fully charge the battery).

Figure 2:
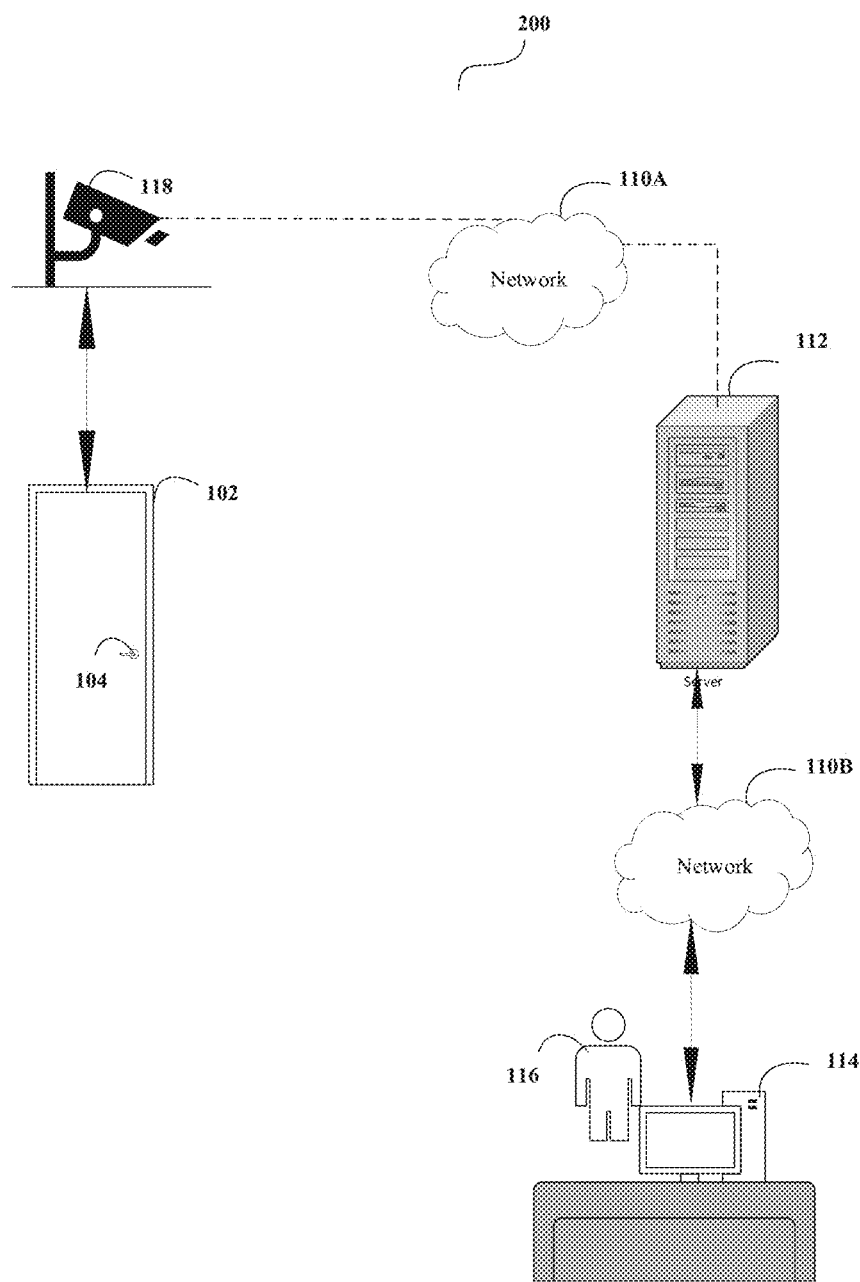
FIG. 2 depicts an exemplary system architecture according to an exemplary second embodiment of the invention.

FIG. 2 depicts an exemplary system architecture 200 in accordance with a second exemplary embodiment for analyzing audits to generate an audit report and generating an augmented reality image that exhibits as a status of component/s of a first device 104 in the audit report, according to an exemplary second embodiment of the invention. As depicted in FIG. 2, the system architecture 200 comprises a door 102, a first device 104 associated with the door 102, an augmented reality camera 118, a server 112 connected with the network 110A/110B, a user terminal 114 and a person 116 associated with the user terminal 114.

The first device 104 may detect a status of each of one or more components of the first device 104 and may generate audits of the status of each of one or more components as described in FIG. 1 above. The first device 104 may then transmit the audits associated with the first device 104 to the augmented reality camera 118 over a short-range communication channel.

When, the augmented reality camera 118 receives the audits associated with the first device 104, the augmented reality camera 118 may analyze the audits to generate an audit report of status of each of the one or more components of the first device 104. Each audit is associated with a pre-generated image for the one or more components. The pre-generated image for the one or more components is already stored on the augmented reality camera 118. In case, the augmented reality camera 118 does not have the pre-generated image, then the augmented reality camera 118 may fetch the pre-generated image from the server 112. The audit report includes all the audits generated and transmitted by the first device 104. The augmented reality camera 118 may analyze the audits to retrieve the status of the one or more components of the first device 104 and then the augmented reality camera 118 may compile the status of the one or more components in the audit report. Once the audit report is generated by the augmented reality camera 118, the augmented reality camera 118 may generate an augmented reality image for the one or more components based on the pre-generated image. The augmented reality image exhibits the status in the audit report for the one or more components of the first device 104. The augmented reality camera 118 may generate the augmented reality image by using the pre-generated image for the one or more components to exhibit as the status in the audit report. This has been explained in detail in FIG. 3. Moreover, the augmented reality image 300 may also exhibit a solution (along with the status) for the one or more components of the first device 104 when the status of the one or more components corresponds to the failure state or the about-to-fail state of the one or more components.

In a different embodiment, the present invention also encompasses the augmented reality camera 118 to transmit the augmented reality image exhibiting the status of the one or more components of the first device 104 to the server 112 through the network 110A. Then, the person 116 associated with the user terminal 114 may retrieve/access the augmented reality image (exhibiting the status of the one or more components) from the server 112 using the network 110B. As used herein, the user terminal 114 may be an electronic device used by a staff of a hotel or a front desk system.

Figure 3:
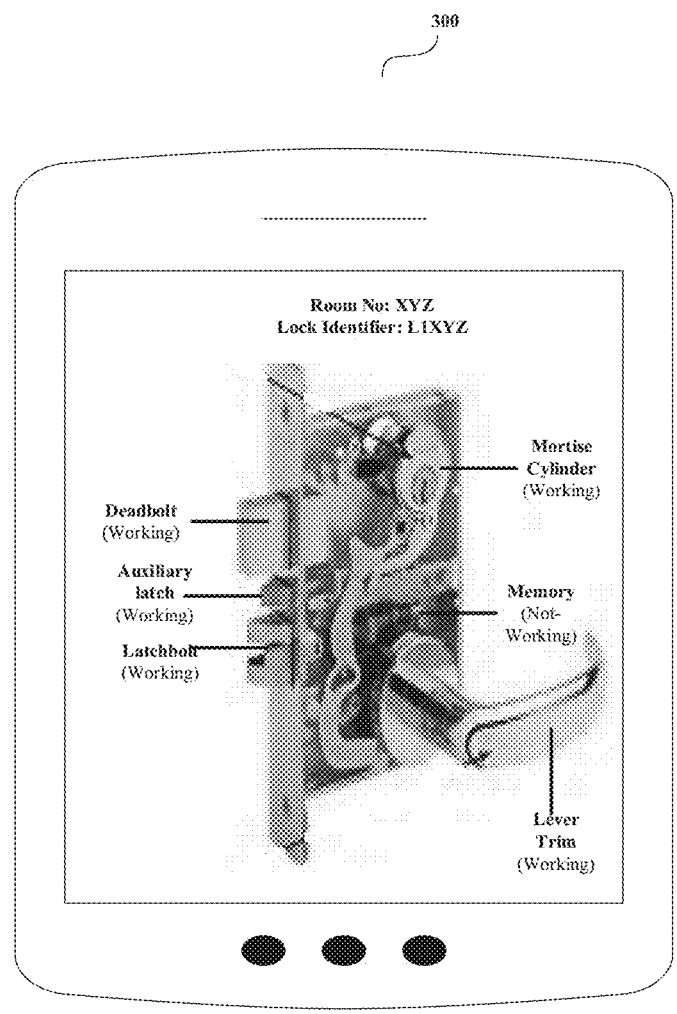
FIG. 3 depicts an exemplary augmented reality image including status of one or more components of pre-generated images.

FIG. 3 depicts an exemplary augmented reality image of a lock including status of the one or more components of pre-generated images of the lock. As depicted in FIG. 3, the augmented reality image 300 is displayed on an interface of the second device 106 and the augmented reality image 300 depicts a pre-generated image of the one or more components of the first device 104 exhibiting status of each of the one or more components of the first device 104. The augmented reality image 300 shows that one or more components of the first device 104 along with status of each of the one or more components of the first device 104. For an instance, the one or more components of the first device 104 may be a deadbolt, an auxiliary latch, a latch bolt, a liver trim, a memory, and/or a mortise cylinder as shown in the augmented reality image 300. The augmented reality image 300 also depicts that the memory component of the first device 104 is not working and rest of the components of the first device 104 are working properly. Such status of the components of the first device 104 can be projected or superimposed on the pre-generated image for the one or more components of the first device 104. The augmented reality image 300 shows exemplary components of the first device 104, however, it is understood for a person skilled in the art that the first device 104 can have other any components as known in the art.

The augmented reality image 300 may also include a highlighted component of the first device 104 based on the status in the audit report of the component. In other words, the components of the first device 104 which are not working may be highlighted in the augmented reality image 300. Also, the exact position is shown in the augmented reality image 300 for each of the components of the first device 104 which are not working. Moreover, the augmented reality image 300 may indicate a position/location where an error or problem has occurred in the first device 104 based on the status in the audit report. Further, the augmented reality image 300 may be generated by superimposing the status of the one or more components on the pre-generated image. In an alternative embodiment, the augmented reality image 300 may be generated by projecting the status of the one or more components on the pre-generated image.

Figure 4:
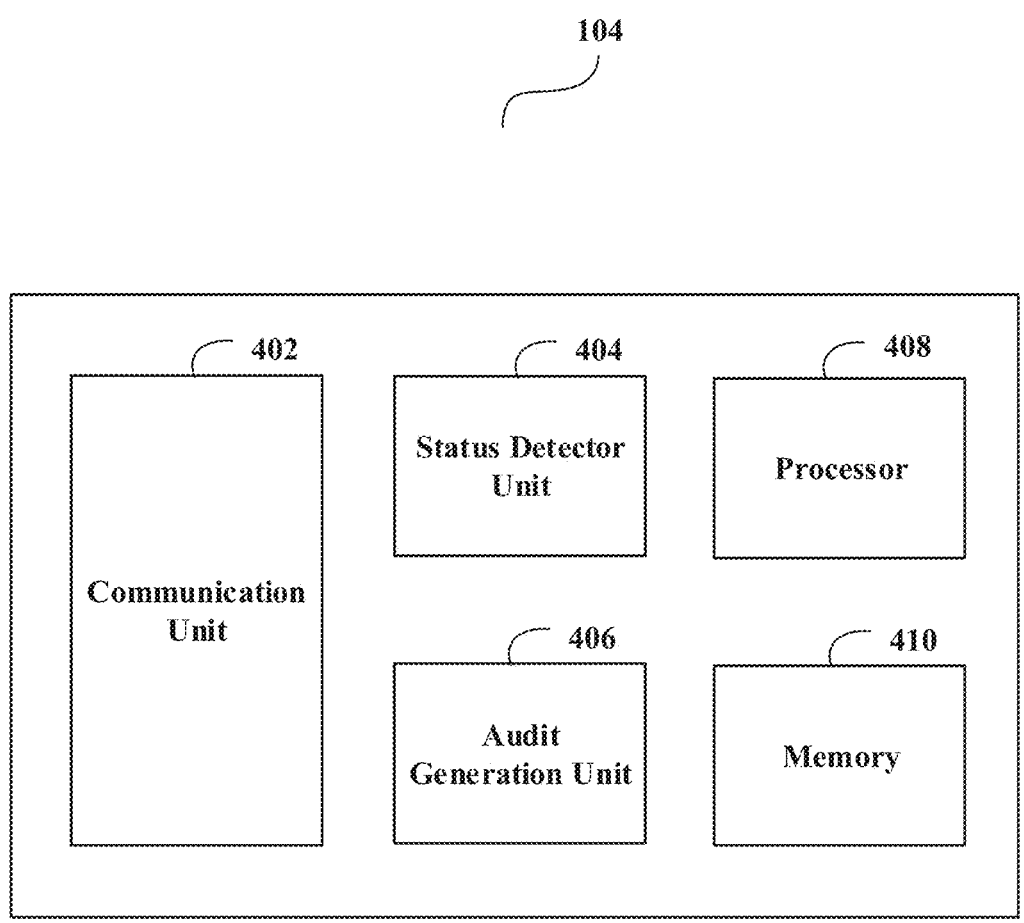
FIG. 4 exemplary block diagram of different components in a first device according to an exemplary embodiment of the invention.

FIG. 4 depicts exemplary block diagram of different components in a first device 104, according to an exemplary embodiment of the invention. The first device 104 may comprise, but is not limited to, a communication unit 402, a status detector unit 404, an audit generation unit 406, a processor 408 and a memory 410. The status detector unit 404 may be adapted to detect status of each of the one or more components of the first device 104. The audit generation unit 406 may be adapted to generate audits after receiving the status of each of the one or more components from the status detector unit 404. The communication unit 402 may be adapted to transmit the audits associated with the first device 104 to the second device 106 over a communication channel. The communication channel may correspond to a short-range communication channel. The memory 410 may be configured to store audits associated with the first device 104. The communication unit 402, the status detector unit 404, the audit generation unit 406 and/or the memory 410 may be communicably coupled with the processor 408.

Figure 5:
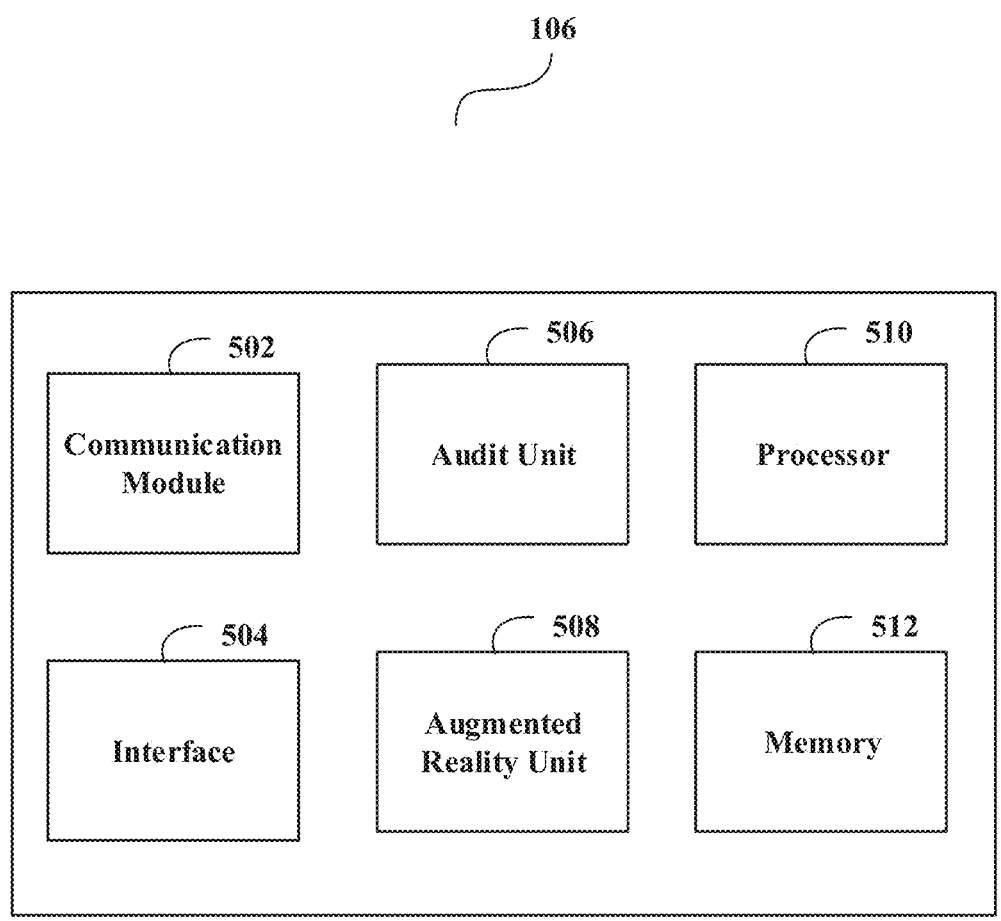
FIG. 5 depicts an exemplary block diagram of different components in a second device according to an exemplary embodiment of the invention.

FIG. 5 depicts an exemplary block diagram of different components in a second device 106 according to an exemplary embodiment of the invention. The second device 106 may comprise, but is not limited to, a communication module 502, an interface 504, an audit unit 506, an augmented reality unit 508, a processor 510 and a memory 512. The communication module 502 may be adapted to receive the audits from the communication unit 402 of the first device 104. The audit unit 506 may be adapted to analyze the audits to generate an audit report of a status of each of the one or more components, each audit associated with a pre-generated image for the one or more components. The augmented reality unit 508 may be adapted to generate an augmented reality image of the status of the one or more components based on the pre-generated image, the augmented reality image exhibiting as a status in the audit report for the one or more components of the first device. The interface 504 may be adapted to display the augmented reality image on the second device 106. The memory 512 may be configured to store the augmented reality image along with the status associated with the first device 104. The communication module 502, the interface 504, the audit unit 506, the augmented reality unit 508 and/or the memory 512 may be communicably coupled with the processor 510.

Figure 6:
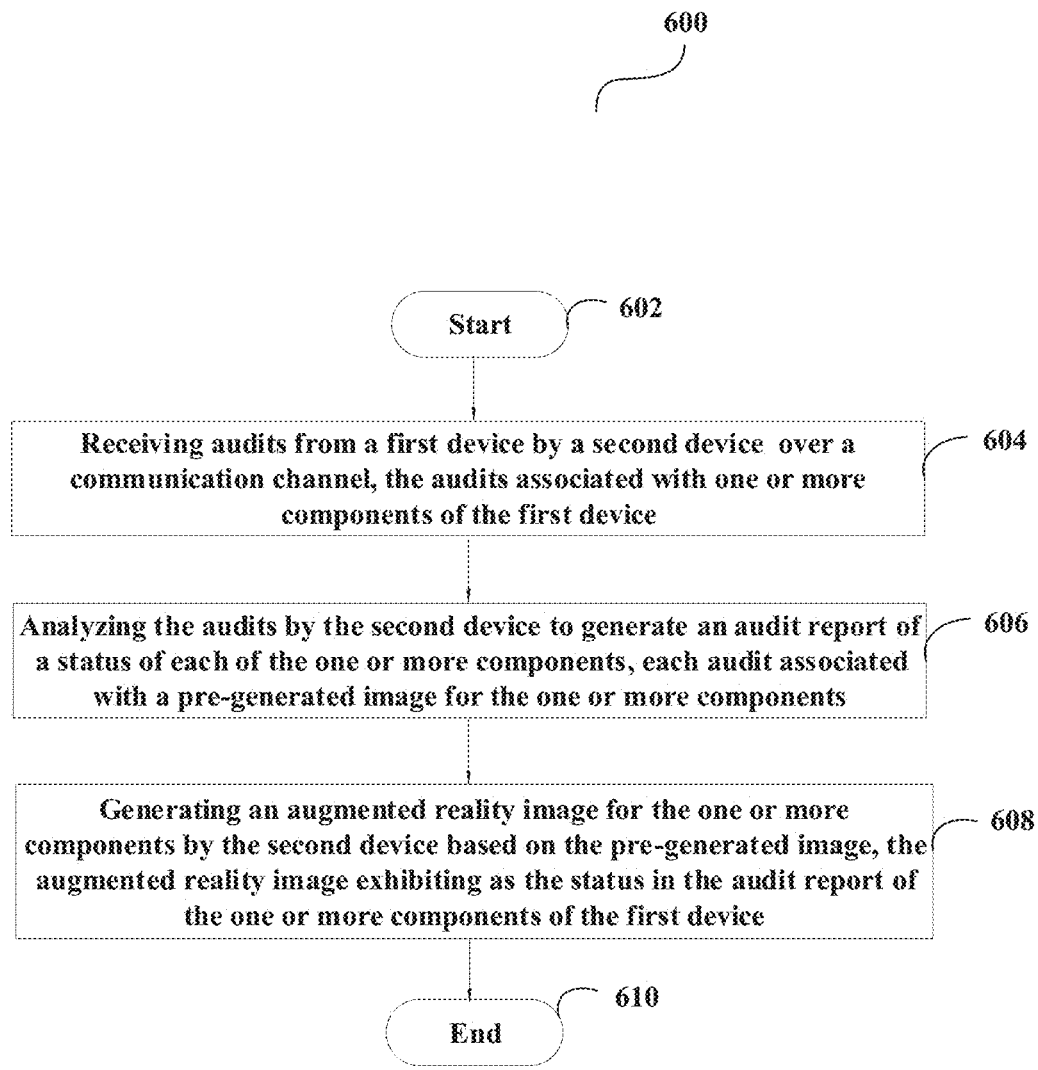
FIG. 6 depicts a flow chart illustrating a method to perform the invention according to an exemplary embodiment of the invention.

FIG. 6 depicts a flow chart illustrating a method to perform the invention according to an exemplary embodiment of the invention. The method flowchart 600 starts at step 602.

At step 604, a second device 106 or a server 112 may receive the audits from a first device 104 over a communication channel. The communication channel may correspond to a short-range communication channel or a cellular channel. In particular, the short-range communication channel may be a channel in a bluetooth mesh network. The audits are associated with one or more components of the first device 104.

At step 606, the second device 106 or a server 112 may analyze the audits to generate an audit report of a status of each of the one or more components, each audit associated with a pre generated image for the one or more components of the first device 104.

At step 608, the second device 106 or a server 112 may generate an augmented reality image for the one or more components based on a pre-generated image of the one or more components. The augmented reality image exhibits as a status in the audit report of the one or more components of the first device 104. The method flowchart ends at 610.

The present invention also encompasses to generate an augmented reality password to unlock the augmented reality image. Further, the augmented reality password comprises a sequence in which the one or more components of the first device 104 are to be selected to unlock the augmented reality image. Also, the augmented reality password can also be used to access the first device 104 or can be used to override the tampering of the first device 104.

The present invention is applicable in various fields such as hotels, hospitals, real estate field, residential area, a building, commercial buildings, vehicles and any such field that require a locking system and is obvious to a person skilled in the art.

The present invention provides the following technical advantages over the existing methods and systems 1) using augmented reality technology which helps in identifying real-time status of the one or more components of the first device, b) eliminates manual intervention for analyzing the lock audits, c) reduces time for analyzing the lock audits, d) provides easy way to depict status of the one or more components of the first device, and e) provides better depiction of working and non-working of components of the first device.

The embodiments of the invention discussed herein are exemplary and various modification and alterations to a person skilled in the art are within the scope of the invention.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of". The phrase "one or more of the following: A and B means "at least one of A and/or at least one of B.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving audits from a first device by a second device over a communication channel, the audits associated with one or more components of the first device;
analyzing the audits by the second device to generate an audit report of a status of the one or more components, each of the audits associated with a pre-generated image for the one or more components; and
generating an augmented reality image for the one or more components by the second device based on the pre-generated image, the augmented reality image exhibiting the status of the one or more components in the audit report of the one or more components of the first device;
wherein the audit report comprises the status of the one or more components of the first device, wherein the status of the one or more components comprises a working state, a failure state or an about-to-fail state of the one or more components;
wherein the second device identifies a solution for the one or more components of the first device when the status of the one or more components corresponds to the failure state or the about-to-fail state of the one or more components;
wherein the second device determines an error margin by comparing an implementation of the solution for the one or more components on the first device with the solution for the one or more components identified by the second device.

2. The method of claim 1, wherein the solution for the one or more components is exhibited in the augmented reality image along with the status of the one or more components of the first device.

3. The method of claim 1, wherein the augmented reality image comprises a highlighted component based on the status of the one or more components in the audit report of the one or more components.

4. The method of claim 1, wherein the augmented reality image comprises superimposition of the status of the one or more components on the pre-generated image or projection of the status of the one or more components on the pre-generated image.

5. The method of claim 1, wherein the communication channel between the first device and the second device corresponds to a short-range communication channel.

6. The method of claim 1, wherein the first device corresponds to a lock and the second device corresponds to a user device or an augmented reality camera, wherein the augmented reality image is rendered on the user device.

7. The method of claim 1, wherein the augmented reality image is generated by an augmented reality camera, wherein the generated augmented reality image is communicated to a user terminal via a server.

8. The method of claim 1, wherein the pre-generated image for the one or more components are stored in the second device, wherein the second device fetches the pre-generated image from a server.

9. A method comprising:
receiving audits from a first device by a second device over a communication channel, the audits associated with one or more components of the first device;
analyzing the audits by the second device to generate an audit report of a status of the one or more components, each audit of the audits associated with a pre-generated image for the one or more components;
generating an augmented reality image for the one or more components by the second device based on the pre-generated image, the augmented reality image exhibiting the status of the one or more components in the audit report of the one or more components of the first device;
generating an augmented reality password to unlock or access the augmented reality image, wherein the augmented reality password comprises a sequence in which the one or more components of the first device are to be selected to unlock the augmented reality image.

10. A system comprising:
a first device comprising:
a status detector unit adapted to detect status of one or more components of the first device;
an audit generation unit adapted to generate audits after receiving the status of the one or more components from the status detector unit; and
a communication unit adapted to transmit the audits associated with the first device over a communication channel; and
a second device comprising:
a communication module adapted to receive the audits from the communication unit of the first device;
an audit analysis unit adapted to analyze the audits to generate an audit report of the status of the one or more components, each of the audits associated with a pre-generated image for the one or more components; and
an augmented reality unit adapted to generate an augmented reality image for the one or more components based on the pre-generated image, the augmented reality image exhibiting the status of the one or more components in the audit report for the one or more components of the first device;
wherein, the augmented reality unit is adapted to generate an augmented reality password to unlock or access the augmented reality image and the augmented reality password comprises a sequence in which the one or more components of the first device are to be selected to unlock the augmented reality image.

11. The system of claim 10, wherein the augmented reality image comprises a highlighted component based on the status of the one or more components in the audit report of the one or more components.

12. The system of claim 10, wherein the augmented reality image comprises of a superimposition of the status of the one or more components on the pre-generated image or a projection of the status of the one or more components on the pre-generated image.

13. The system of claim 10, wherein the audit report comprises of the status of the one or more components of the first device, wherein the status of the one or more components comprises a working state, a failure state or an about-to-fail state of the one or more components.

14. The system of claim 10, wherein the first device corresponds to a lock and the second device corresponds to a user device or an augmented reality camera, wherein the augmented reality image is generated by the augmented reality camera and the generated augmented reality image is communicated to a user terminal via a server.

15. The system of claim 10, wherein the pre-generated image for the one or more components is stored in the second device, wherein the second device fetches the pregenerated image from a server.

\* \* \* \* \*